United States Patent Office 3,090,235
Patented May 21, 1963

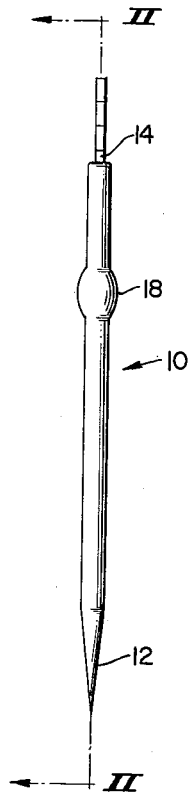
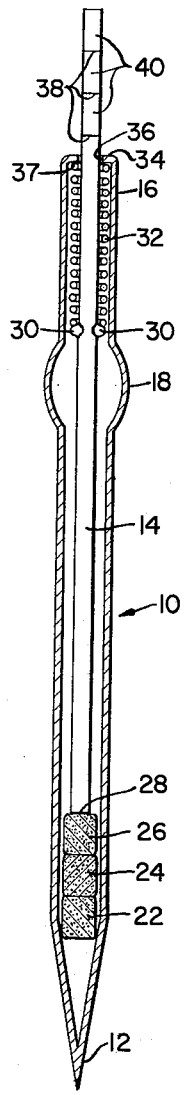
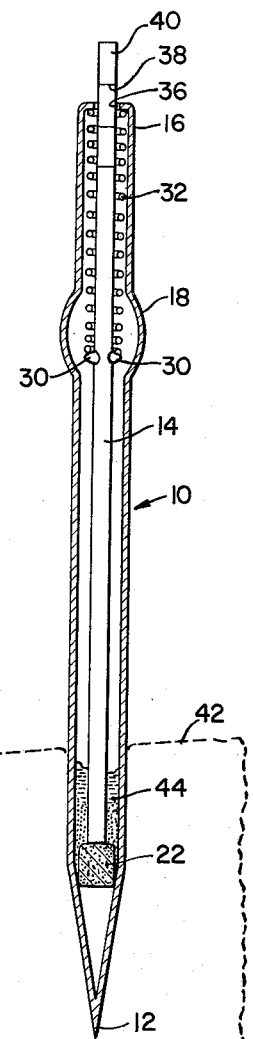
Fig.1.
Fig.2.
Fig.3

3,090,235
TEMPERATURE RESPONSIVE DEVICE
Roy W. Houser, Orange, Calif., assignor to Robertshaw-Fulton Controls Company, Richmond, Va., a corporation of Delaware
Filed Jan. 12, 1961, Ser. No. 82,356
1 Claim. (Cl. 73—358)

This invention relates to a temperature responsive device and more particularly to a device for determining the internal temperature of meat or a like material which is being heated.

It is an object of this invention to indicate a plurality of internal temperatures of a material being heated by temperature responsive means incorporating fusible means.

A further object of this invention is an easily identified indicia for readily determining one of a plurality of temperatures recorded by a temperature responsive device.

Another object of this invention is to facilitate ease of insertion and removal of the means responsive to the internal temperature of the material being heated.

Still another object of this invention is to construct simply and economically a meat thermometer for disposal after one use.

Briefly stated in accordance with one aspect of this invention, a hollow tube, which is formed to have a closed pointed end and an opposite open end, has an elongated rod concentrically disposed the length of the tube. A portion of the rod protrudes out of the open end. A coil spring is disposed within the tube so as to surround that portion of the rod adjacent the open end of the tube and is mounted in compression between abutment means in the form of lateral extensions on the rod and the inwardly formed periphery of the open end of the tube. The rod is biased to engage a plurality of pellets of fusible material positioned within the tube adjacent the pointed end, which pellets permit the rod to move further into the tube when heated to their individual melting temperatures. The protruding end of the rod is appropriately marked so as to denote the internal temperature of the material being heated.

Other objects and advantages will become apparent from the following description taken in connection with the accompanying drawings wherein:

FIG. 1 is an elevation view of a meat thermometer embodying this invention;

FIG. 2 is an enlarged section taken along the line II—II of FIG. 1; and

FIG. 3 is a view similar to FIG. 2 showing the parts in another position.

Referring now to FIG. 1, the temperature responsive device comprises a tubular housing 10 having a conical pointed end 12 integrally formed on one end. An indicator rod 14 is slidably positioned within tubular housing 10 and is of sufficient length so as to protrude a short distance out of the open end 16 of housing 10. A bulbous portion 18 is integrally formed intermediate the remote ends of housing 10 and is adapted to facilitate manual insertion and removal of the temperature responsive device into a material.

As better illustrated in FIG. 2, housing 10 has one end tapered to form a sealed pointed end 12 to facilitate insertion into a material, such as meat. Located adjacent end 12 within the hollow confines of housing 10 are three spacer pellets 22, 24, and 26. For purposes of description only, three pellets have been selected but it will be obvious that the number can be reduced or increased without departing from the scope of the invention. Further, the pellets 22, 24, and 26, illustrated in FIG. 2, have been shown as being substantially cylindrical in shape with each pellet being of equal height. As will be obvious from the description hereinbelow, each pellet can be formed to other configurations, such as spheres.

Each of the pellets 22, 24, 26, respectively, is formed from a different temperature responsive fusible material which can be compounded of wax or any other suitable low temperature melting substance. At the particular melting temperature of each pellet, its material undergoes a change of state from a solid to a liquid. In this embodiment, the fusible material pellets 22, 24, and 26 are selected to melt or soften at specific temperatures, such as 140° F., 160° F., and 170° F., respectively.

The elongated indicator rod 14 is slidably positioned within housing 10 in a manner such that one end 28 abuts against the upper surface of pellet 26. Intermediate the length of indicator rod 14, a plurality of projections 30 are formed as by being swaged or crimped on the peripheral surface of indicator rod 14. A coiled compression spring 32 is disposed concentric to and intermediate of housing 10 and rod 14. The open end 16 of housing 10 is cupped or turned in to form a centrally bored top 34, the edge of which defines an aperture 36 in the free end 16. The top 34 acts as both a guide for indicator rod 14 and as a fixed indicating means for indicator rod 14. In addition, the inwardly extending peripheral area adjacent to aperture 36 forms a retainer 37 for spring 32.

Spring 32 is mounted in compression between retainer 37 and projection 30 to bias indicator rod 14 into engagement with pellet 26 and, further, to bias the pellets 22, 24, and 26 into engagement with each other and urge pellet 22 into abutment with the sides of tapered pointed end 12.

That portion of the indicating rod 14 which protrudes out of aperture 36 can be scribed or marked in a manner such as to indicate a particular temperature condition. Each scribe mark 38 is spaced from its adjacent scribe mark a distance equal to the height of each pellet with the lowermost scribe mark spaced approximately one half the height of a pellet from ends 34. Indicia 40 which can be coded by colors, letters, or numbers are located intermediate adjacent scribe marks to indicate a particular temperature condition.

As shown in FIG. 3, pointed end 12 of housing 10 of the temperature responsive device has been partially inserted into a material being heated, such as meat 42. Heat is supplied to the material from an outside source (not shown) and as diagrammatically shown in FIG. 3, pellets 24 and 26 have melted so as to form a liquid material 44 within housing 10. Fusible material pellet 22 remains in the solid state condition as the temperature of the material being heated has not reached a temperature sufficiently high to change fusible material pellet 22 from a solid state to a liquid state.

With reference to pellets 22, 24, and 26, described above, at a temperature of 140° F., pellet 26 was changed from a solid state to a liquid, and at 160° F., pellet 24 was changed from a solid state to a liquid. The two liquids resulting have combined and are now indicated as liquid 44, located within housing 10 and above pellet 22. As each pellet became a liquid, the biasing force of compression spring 32 moved indicator rod 14 towards the pointed end 12 of housing 10 so that the indicia 40 of rod 14 moves into the tube relative to aperture 36 of end 16.

In the position of indicator rod 14, as shown in FIG. 3, the temperature of the material being heated would be at least 160° F. and less than 170° F. as indicated by the position of the scribe marks 38 on indicator rod 14.

The temperature responsive device contemplated by this invention is fully portable and requires no remote connections or controls. Further, it will be obvious that the temperature responsive device described herein can be modified by incorporating various compositions for the pellets so as to indicate a specific temperature or a temperature range of the particular material being heated. As an example, it is contemplated that the composition of the pellets described above would be used to indicate the condition of a meat, such as steak, which is in the "rare" condition at 140° F., "medium" condition at 160° F., and "well done" condition at 170° F.

In addition, the temperature responsive device disclosed herein can be readily manufactured at low cost because of the relatively economical materials used in constructing the elements therein, which elements need not be manufactured to exacting tolerances.

Further, assembly of the temperature responsive device is facilitated by dimensioning the fusible material pellets so that the pellets will slidably fit within the inner confines of the housing. The fusible material pellets are first separately introduced in the housing, after which the indicator rod is inserted to abut against the surface of the uppermost fusible element. A biasing means, which need not necessarily be a compression spring, urges the rod into engagement with the pellets. Consequently, the indicator rod need only engage one pellet and need not be embedded in the fusible material, thus further economizing manufacturing costs.

Therefore, it will be readily appreciated that the thermally responsive device described herein can be economically constructed so that it can be used as a meat thermometer suitable for a single use after which it can be discarded.

It is to be understood that changes can be made in the arrangement of parts and in the details of construction within the scope of the appended claim without departing from the invention disclosed herein.

I claim:

A disposable thermal responsive device, the combination comprising an elongated tubular housing having an open end and a sealed end adapted for insertion into a heated material, an annular portion formed on said open end, hand holding means formed intermediate the length of said housing, a plurality of fusible elements disposed longitudinally within said housing abutting said sealed end, each of said fusible elements having a different determinable fusible temperature with adjacent elements having successively lower fusion temperatures from the sealed end to the open end, an elongated indicator rod coaxially positioned within said housing, a portion of said rod protruding outwardly of said annular portion formed on said open end of said housing, indicia on said protruding portion of said indicator rod spaced in increments corresponding to the determinable height of each of said fusible elements, said indicia cooperating with said annular portion of said housing to indicate a determinable temperature, and means operatively connected to said indicator rod for biasing said indicator rod into engagement with said fusible element having the lowest fusion temperature whereby an increase in temperature of said housing successively changes each of said fusible elements from a solid to a liquid to successively move said indicator rod, which successive movement is indicated by said indicia cooperating with said annular portion.

References Cited in the file of this patent
UNITED STATES PATENTS

| | | |
|---|---|---|
| 1,387,890 | Kleidman | Aug. 16, 1921 |
| 1,441,307 | Swanberg | Jan. 9, 1923 |
| 2,677,278 | Smith | Mar. 21, 1950 |